United States Patent [19]

Hibbert

[11] Patent Number: 5,646,212

[45] Date of Patent: Jul. 8, 1997

[54] POLYALKYLENE GLYCOL ANHYDROXY CARBOXYLIC ACID DISPERSANT

[75] Inventor: Peter Glynn Hibbert, Newark, Del.

[73] Assignee: ICI Americas Inc., Wilmington, Del.

[21] Appl. No.: 300,287

[22] Filed: Sep. 2, 1994

[51] Int. Cl.⁶ .......................... C08G 63/00; C08F 20/00
[52] U.S. Cl. .......................... 524/400; 106/437; 106/447; 106/465; 106/491; 106/499; 525/437; 528/271
[58] Field of Search .......................... 106/437, 447, 106/465, 491, 499, 311; 524/500; 560/182, 200; 528/271; 525/437

[56] References Cited

U.S. PATENT DOCUMENTS 3,778,287  12/1973  Stansfield et al. .......................... 106/496
4,203,877  5/1980  Baker .......................... 524/500

Primary Examiner—Terressa M. Mosley
Attorney, Agent, or Firm—John F. Daniels, III

[57] ABSTRACT

This invention relates to novel polymeric compounds, more particularly to novel block or graft copolymers which are useful in dispersing inorganic pigments, lakes and/or toners in organic medium, to methods for preparing such copolymers, and to surfactant compositions containing such polymers. The block or graft copolymers of the invention belong to the class in which one type of polymeric component is derived from an oil-soluble complex monocarboxylic acid and another component which is the residue of an alkyl glycol and/or a polyoxyalkylene compounds.

29 Claims, No Drawings

POLYALKYLENE GLYCOL ANHYDROXY CARBOXYLIC ACID DISPERSANT

This invention relates to novel polymeric compounds, more particularly to novel block or graft copolymers which are useful in dispersing inorganic pigments, lakes and/or toners in organic medium, to methods for preparing such copolymers, and to surfactant compositions containing such polymers.

The block or graft copolymers of the invention belong to the class in which one type of polymeric component is derived from an oil-soluble complex monocarboxylic acid and another component which is the residue of an alkyl glycol and/or polyalkylene compounds. Certain members of this class are already known from British Pat. No. 1,469,531, which relates to copolymers consisting of a single block derived from the complex acid and a single block which is the residue of a polyalkylene glycol, and U.S. Pat. No. 4,203,877 which relates to copolymers derived from an oil-soluble complex mono-carboxylic acid having a molecular weight over 500 and a water-soluble polyoxyalkylene containing compound having a molecular weight of at least 500. Although these copolymers possess useful surfactant properties, they have structural and chemical composition limitations which restrict the ability to choose a composition which affords the optimum surface active characteristics for a given system. Furthermore, the copolymers of this type tend to be waxy or solid compositions which not only limit their applicability but also complicate their handleability by requiring drum warmers and other special handling equipment. Whereas, the copolymers of the present invention which tend to be liquids overcome these disadvantages.

Accordingly, one aspect of the invention is to provide a compound useful for dispersing inorganic pigments, lakes and/or toners in organic medium.

Another aspect of the invention is to provide a high molecular weight liquid surfactant compound.

A still further aspect of the invention is to provide a surfactant composition suitable for forming a dispersion of inorganic pigments, lakes or toners in an organic medium.

Another advantage of the copolymers of the present invention is that they are liquids despite the fact that they typically have higher molecular weights than the waxy/solid copolymers known in the art and thus have improved handleability.

An additional aspect of the present invention is to provide a method of forming a polymeric compound formed from an oil-soluble complex monocarboxylic acid and an alkyl glycol and/or polyalkylene glycol.

The above aspects and other additional aspects of the invention will become more fully apparent from the following description and accompanying Examples.

DETAILED DESCRIPTION OF THE INVENTION

The copolymer of this invention has a general formula $(A-COO)_2-B$ wherein each polymeric component A has a molecular weight of at least 500 and is the residue of an oil-soluble complex monocarboxylic acid having the following general structural formula:

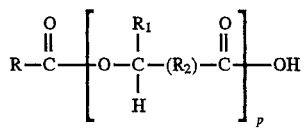

in which
R is hydrogen or a monovalent hydrocarbon or substituted hydrocarbon group;
$R_1$ is hydrogen or a monovalent $C_1$ to $C_{24}$ hydrocarbon group;
$R_2$ is a divalent $C_1$ to $C_{24}$ hydrocarbon group;
p is an integer from 1 up to 200;
and wherein each polymeric component B has a molecular weight of less than 500 and is the divalent residue of an alkyl glycol or polyalkylene glycol having the structure of the following general formula:

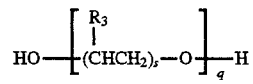

wherein
$R_3$ may be the same or different and is selected from the group consisting of hydrogen, methyl, ethyl and propyl;
q is an integer from 1 to 11
s is an integer from 1 to 17.

The quantity q and s will normally vary statistically about an average value within the range stated, and somewhat wider variation may be deliberately introduced if desired by deriving the component B from a mixture of two or more glycols of differing average chain lengths.

The complex monocarboxylic acid, from which the polymeric components A are derived by the notional removal of the carboxyl group, is structurally the product of interest-erification of one or more monohydroxymonocarboxylic acids together with a monocarboxylic acid free from hydroxyl groups which acts as a chain terminator. The substituted or unsubstituted hydrocarbon chains R, $R_1$ and $R_2$ may be linear or branched. R is preferably an alkyl radical containing up to 25 carbon atoms, for example a straight-chain $C_{17}H_{35}$-radical derived from stearic acid. $R_1$ is preferably a straight-chain alkylene radical; for example, the unit containing $R_1$ and $R_2$ may be derived from 12-hydroxy-stearic acid.

The alkyl glycol and/or polyalkylene glycol from which the polymeric component B is derived by the notional removal of the two terminal hydroxyl groups, may be, for example, ethylene glycol, propylene glycol, other alkyl glycols (i.e. $C_4-C_5$), a polyethylene glycol, a polypropylene glycol, and mixtures or combinations thereof, that is to say $R_3$ may be hydrogen, methyl, ethyl or propyl. More typically component B is derived from polyethylene glycol or 1,4 butane diol.

By defining that the complex monocarboxylic acid is oil-soluble, we mean that the oil phase of the system in which the block or graft copolymer is to be used as surfactant should be better than a theta-solvent for the complex monocarboxylic acid. The significance of the expression "theta-solvent" is discussed in "Polymer Handbook" (Ed. Brandrup and Immergut, Interscience, 1966) at Vol. VI pages 163–166. Briefly, this definition implies that a polymer which is dissolved in a solvent which is better than a theta-solvent therefore exists in a non-self-associated condition. The definition is usually satisfied by any liquid which would normally be referred to as a "good" solvent for the polymer in question. Considerable variation is possible in the composition of the complex monocarboxylic acid whilst meeting the requirement that the acid should be oil-soluble in the foregoing sense, according to the chosen nature of the group R, $R_1$ and $R_2$. Generally speaking, the more the oil phase of the system tends towards a fully aliphatic character, the longer will the hydrocarbon chains of these groups need to be.

Typically each of the polymeric components A has a molecular weight of at least 1000 (by "molecular weight" is meant wherein number average molecular weight), preferably a molecular weight of 1500 and most preferable a molecular weight in excess of 1750. Thus where, for example the group R is derived from stearic acid and the unit containing $R_1$ and $R_2$ together is derived from 12-hydroxystearic acid, "p" will have a value of at least 2. It is typically required that the polymeric component B has a molecular weight (by "molecular weight" is meant wherein number average molecular weight) of less than 500, more typically a molecular weight of from 50 to 450, and preferably a molecular weight from 70 up to and including 400. Thus where component "B" is the residue of an alkyl glycol, such as when "q" is equal to 1, "s" will typically have a value of at least 2 but less than 17, preferably less than 5, most preferably 2 or 3; or when such component is derived from a polyalkylene glycol, when "q" has a value of at least 2, typically between 2 and 9, preferably between 4 and 9; "s" will preferably have a value of 1.

In any given block or graft copolymer of the general formula hereinabove defined, the weight ratio of the combined components A to component B may vary widely. Typically the molar ratio will lie in the range from 125:1 to 2:1, more typically the ratio is in the range of between 17:1 and 8:1; but molar ratios outside these ranges may be appropriate for certain applications of the copolymers. In A—COO—B—OOC—A block copolymers, where the component B is derived from polyethylene glycol and the components A are derived from poly(12-hydroxystearic acid), the weight proportion of polyethylene glycol residues may be up to 20% but more typically are between 4% and 12%.

The block or graft copolymers of the invention may be obtained by procedures which are well known in the art. According to one procedure, they are prepared in two stages. In the first stage, the complex monocarboxylic acid from which the Components A are to be derived is obtained by interesterification of a monohydroxy monocarboxylic acid in the presence of a nonhydroxylic monocarboxylic acid; in the second stage, this complex monocarboxylic acid is reacted with the alkyl glycol or polyalkylene glycol from which the component B is to be derived, in a molar ratio of 2:1 respectively. The hydroxyl group in the monohydroxy-monocarboxylic acid, and the carboxyl group in either carboxylic acid, may be primary, secondary or tertiary in character. Suitable hydroxycarboxylic acids for use in the first stage include glycollic acid, lactic acid, hydracrylic acid and, in particular, 12-hydroxystearic acid. The nonhydroxylic carboxylic acid which acts as a chain terminator, and hence as a means of regulating the molecular weight of the complex monocarboxylic acid, may be, for example, acetic acid, propionic acid, caproic acid, in particular, stearic acid or an acid derived from a naturally occurring oil, such as tall oil fatty acid. Commercial quantities of 12-hydroxystearic acid normally contain about 15% of stearic acid as an impurity and can conveniently be used without further admixture to produce a complex acid of molecular weight about 1500–2000. Where the non-hydroxylic monocarboxylic acid is separately introduced, the proportion which is required in order to produce a complex monocarboxylic acid of a given molecular weight would be known by one of ordinary skill in the art or readiliy determined by simple calculation.

The interesterification of the monohydroxy-monocarboxylic acid and the non-hydroxylic monocarboxylic acid may be effected by heating the starting materials alone, or in a suitable hydrocarbon solvent such as toluene or xylene, which is able to form an azeotrope with the water produced in the esterification reaction. These reactions are typically carried out in an inert atmosphere, e.g. nitrogen, at a temperature of up to 250° C. conveniently at the refluxing temperature of the solvent. Where the hydroxyl group is secondary or tertiary, the temperature employed should not be so high as to lead to dehydration of the acid molecule. Catalysts for the interesterification, such as p-toluene sulphonic acid, zinc acetate, zirconium naphthenate or tetrabutyl titanate, may be included, with the object of either increasing the rate of reaction at a given temperature or of reducing the temperature required for a given rate of reaction. A preferred method of carrying out the interesterification is to effect the reaction at an elevated temperature, without xylene but using a stream of inert gas to remove the water produced. Such a procedure yields products which are 100% solids and do not contain the environmentally unfriendly xylene.

In the second stage of the first procedure for obtaining the block or graft copolymers of the invention, the complex monocarboxylic acid prepared in the first stage is reacted with the alkyl glycol or polyalkylene glycol from which the component B is to be derived. For each molar proportion of the glycol, there are taken 2 molar proportions of the acid. The reaction is suitably carried out under the same conditions as have been described for the first stage.

According to the second procedure for obtaining the copolymers of the invention, the two reactions described above are carried out simultaneously, that is to say, the monohydroxy-monocarboxylic acid, the nonhydroxylic monocarboxylic acid and the alkyl glycol or polyalkylene glycol are all heated together in the same proportions as would have been taken for the first procedure, in a hydrocarbon solvent at a temperature of up to 250° C., optionally in the presence of a catalyst and observing due precautions.

The copolymers obtained by the two alternative procedures from the same starting materials and in the same proportions, appear to be very similar in composition and characteristics but, because of its simplicity and consequent greater economy, the second procedure is to be preferred.

The novel block or graft copolymers of the invention are useful particularly by virtue of their pronounced surface active properties. Thus they are highly effective as, for example, wetting and dispersing agents.

The novel block or graft copolymers of this invention are suitable for dispersing inorganic pigments, lakes and/or toners in organic solvents. Suitable inorganic pigments include: prussian blue, cadmium sulphide, iron oxides, vermillion, ultramarine and chrome pigments including chromates of lead, zinc, barium, and calcium; more typically, calcium carbonate, aluminum trihydrate, titanium dioxide. Suitable toners and lakes include those of the water-insoluble metal salt complex.

An example of a particular block or graft copolymer according to the invention is an $(A—COO)_2$—B block copolymer in which each A component is the residue of poly(12-hydroxystearic acid) chain-terminated with stearic acid and of molecular weight approximately 1750, and the B component is the residue of polyethylene glycol of molecular weight less than 500. This copolymer thus contains approximately 8 wt % polyethylene glycol residues and is soluble in organic solvents, aliphatic and aromatic solvents, hydrocarbon oils, toluene, including those low in aromatic content such as low order kerosene, diesel oil and mineral oils.

The invention can be better understood by referring to the following specific examples which teach several embodiments of this invention.

EXAMPLE 1

Preparation of a block or graft copolymer of (A—COO)$_2$—B type containing 5.4%, by weight, of polyethylene glycol mol. wt. 200. residues in a single stage.

About 2818 parts of a commercial grade 12-hydroxystearic acid containing 15% of stearic acid, available from Caschem, Inc., Bayonne, N.J., were introduced into a 5000 ml flask along with about 160.8 parts of polyethylene glycol of mol. wt. 200 and about 5.95 parts of tetrapropyl titanate. All of these were reacted together at 225° C., in the presence of nitrogen gas, until an acid value of approximately 9.3 mg KOH/g was achieved.

EXAMPLE 2

A block copolymer similar to that described in Example 1 but containing 10.2% polyethylene glycol residues was prepared in the manner described in Example 1 from 300 parts of polyethylene glycol mol. wt. 400, 2630 parts of commercial grade 12-hydroxystearic acid, and 6.0 parts of tetrapropyl titanate; the product was condensed to an acid value of 9.0 mg KOH/g.

What is claimed is:

1. A copolymer of the general formula (A—COO)$_2$—B, wherein

A has a molecular weight of at least 500 and is a residue of an oil-soluble complex monocarboxylic acid having the general structural formula:

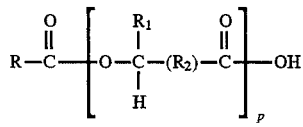

in which

R is hydrogen or a monovalent hydrocarbon group;

R$_1$ is hydrogen or a monovalent C$_1$ to C$_{24}$ hydrocarbon group;

R$_2$ is a divalent C$_1$ to C$_{24}$ hydrocarbon group;

p is an integer from 1 up to 200;

and wherein each polymeric component B has a molecular weight of less than 500 and is the divalent residue of an alkyl glycol or polyalkylene glycol having the structure of the following general formula:

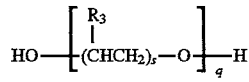

wherein

R$_3$ may be the same or different and is selected from the group consisting of hydrogen, methyl, ethyl and propyl;

q is an integer from 1 to 11 s is an integer from 1 to 17.

2. A copolymer according to claim 1, wherein

R is hydrogen or a monovalent C$_1$ to C$_{24}$ hydrocarbon group.

3. A copolymer according to claim 1, in which component A has a molecular weight of at least 1000.

4. A copolymer according to claim 1, in which each component A is derived from poly (12-hydroxystearic acid) chain-terminated with stearic acid and the component B is derived from polyethylene glycol.

5. A copolymer according to claim 1 in which "q" is at least 2 and "s" is 1.

6. A copolymer according to claim 1 in which each polymeric component A has molecular weight of approximately 1750 and the B component has a molecular weight of approximately 200, and component B comprises between 4% and 12% by weight of the total copolymer.

7. A copolymer according to claim 1 in which component B is derived from polyethylene glycol or 1,4 butane diol.

8. A copolymer according to claim 1 which is soluble in aliphatic hydrocarbons and in which the component B constitutes not more than 20% by weight of the total copolymer.

9. A copolymer of the general formula (A—COO)$_2$—B, wherein

A has a molecular weight of at least 500 and is derived from poly(12-hydroxystearic acid) chain-terminated with stearic acid; and B is derived from polyethylene glycol having a molecular weight of from 70 up to 400.

10. A method of preparing a copolymer of the general formula (A—COO)$_2$—B, wherein A has a molecular weight of at least 500 and is a residue of an oil-soluble complex monocarboxylic acid having the general structural formula:

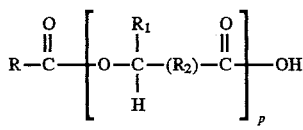

in which

R is hydrogen or a monovalent hydrocarbon group;

R$_1$ is hydrogen or a monovalent C$_1$ to C$_{24}$ hydrocarbon group;

R$_2$ is a divalent C$_1$ to C$_{24}$ hydrocarbon group;

p is an integer from 1 up to 200;

and wherein each polymeric component B has a molecular weight of less than 500 and is the divalent residue of an alkyl glycol or polyalkylene glycol having the structure of the following general formula:

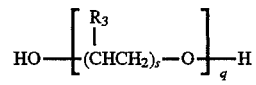

wherein

R$_3$ may be the same or different and is selected from the group consisting of hydrogen, methyl, ethyl and propyl;

q is an integer from 1 to 11 s is an integer from 1 to 17; the method comprising the steps of:

i) reacting a monohydroxymonocarboxylic acid with a nonhydroxy monocarboxylic acid to form the complex monocarboxylic acid from which the component A is derived;

ii) reacting said complex monocarboxylic acid with the alkyl glycol or polyalkylene glycol from which the component B is derived.

11. The method of claim 10 wherein the reactions are carried out in the presence of an inert gas at an elevated temperature.

12. The method of claim 11 wherein the two reactions are carried out simultaneously.

13. The method of claim 12 wherein the two reactions are carried out in the presence of a catalyst.

14. An organic composition comprising: in addition to an organic solvent;

i) A copolymer of the general formula $(A-COO)_2-B$, wherein

A has a molecular weight of at least 500 and is a residue of an oil-soluble complex monocarboxylic acid having the general structural formula:

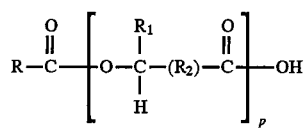

in which

R is hydrogen or a monovalent hydrocarbon or substituted hydrocarbon group;

$R_1$ is hydrogen or a monovalent $C_1$ to $C_{24}$ hydrocarbon group;

$R_2$ is a divalent $C_1$ to $C_{24}$ hydrocarbon group;

p is an integer from 1 up to 200;

and wherein each polymeric component B has a molecular weight of less than 500 and is the divalent residue of an alkyl glycol or polyalkylene glycol having the structure of the following general formula:

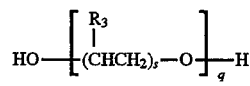

wherein $R_3$ may be the same or different and is selected from the group consisting of hydrogen, methyl, ethyl and propyl;

q is an integer from 1 to 11 s is an integer from 1 to 17; and ii) inorganic pigments, lakes and/or toners.

15. The composition of claim 14 wherein the inorganic pigment is selected from the group consisting of calcium carbonate, aluminum trihydrate, and titanium dioxide.

16. A copolymer according to claim 1 wherein $R_1$ is 6 and $R_2$ is 10.

17. A copolymer according to claim 5 in which the component B has a molecular weight from 70 to 400.

18. A copolymer according to claim 5 in which "q" is 1 and "s" is at least 2 and less than 17.

19. A copolymer according to claim 5 in which "q" is between 2 and 9.

20. A copolymer according to claim 8 in which B constitutes between 4% and 12% by weight of the total copolymer.

21. The method of claim 10 wherein the complex monocarboxylic acid is reacted with the alkyl glycol or polyalkylene glycol in a molar ratio of from 125:1 to 2:1.

22. The method of claim 21 wherein the complex monocarboxylic acid is reacted with the alkyl glycol or polyalkylene glycol in a molar ratio of 2:1.

23. The method of claim 11 wherein the reactions are carried out at a temperature of up to 250° C.

24. A copolymer according to claim 1 in which B has a number average molecular weight of approximately 200.

25. A copolymer according to claim 9 in which B has a number average molecular weight of approximately 200.

26. A copolymer according to claim 10 in which B has a number average molecular weight of approximately 200.

27. A copolymer according to claim 14 in which B has a number average molecular weight of approximately 200.

28. A copolymer according to claim 1 in which component B is derived from propylene glycol or 1,4 butane diol.

29. A copolymer of the general formula $(A-COO)_2-B$, wherein

A has a molecular weight of at least 500 and is a residue of an oil-soluble complex monocarboxylic acid having the general structural formula:

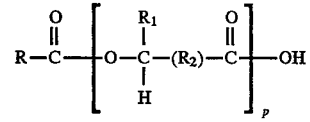

in which

R is hydrogen or a monovalent hydrocarbon group;

$R_1$ is hydrogen or a monovalent $C_1$ to $C_{24}$ hydrocarbon group;

$R_2$ is a divalent $C_1$ to $C_{24}$ hydrocarbon group;

p is an integer from 1 up to 200;

and wherein each polymeric component B has a molecular weight of less than 500 and is derived from propylene glycol or 1,4 butane diol.

* * * * *

UNITED STATES PATENT AND TRADEMARK OFFICE
CERTIFICATE OF CORRECTION

PATENT NO. : 5,646,212
DATED : July 8, 1997
INVENTOR(S) : Hibbert

It is certified that error appears in the above-identified patent and that said Letters Patent is hereby corrected as shown below:

Claim 1 line 36, after "A", and before "copolymer", insert --liquid--;

line 55, after "conponent B has a"

insert --number average--;

line 56, after "less than", and before "and is", delete "500"

and insert --400--.

UNITED STATES PATENT AND TRADEMARK OFFICE
CERTIFICATE OF CORRECTION

PATENT NO. : 5,646,212
DATED : July 8, 1997
INVENTOR(S) : Hibbert

It is certified that error appears in the above-identified patent and that said Letters Patent is hereby corrected as shown below:

Claim 6 line 16, after "B component has a", and before "molecular", insert --number average--;

Claim 9 line 25, after "A", and before "copolymer", insert --liquid--;

line 30, after "having a", and before "molecular weight", insert

--number average--;

line 31, delete "from 70 up to", and insert --less than--.

UNITED STATES PATENT AND TRADEMARK OFFICE
CERTIFICATE OF CORRECTION

PATENT NO. : 5,646,212
DATED : July 8, 1997
INVENTOR(S) : Hibbert

Page 3 of 4

It is certified that error appears in the above-identified patent and that said Letters Patent is hereby corrected as shown below:

Claim 10 line 33, after "preparing a", and before "copolymer", insert --liquid--;

line 51, after "B has a", and before "molecular", insert --number average--;

line 52, delete "500", and insert --400--.

UNITED STATES PATENT AND TRADEMARK OFFICE
CERTIFICATE OF CORRECTION

PATENT NO. : 5,646,212
DATED : July 8, 1997
INVENTOR(S) : Hibbert

It is certified that error appears in the above-identified patent and that said Letters Patent is hereby corrected as shown below:

Claim 14 line 16, after "i) ", and before "copolymer", delete "A", and insert

--a liquid--;

line 35, after "component B has a", and before "molecular", insert

--number average--;

line 36, delete "500", and insert --400--.

Signed and Sealed this

Sixteenth Day of March, 1999

Attest:

Q. TODD DICKINSON

Attesting Officer

Acting Commissioner of Patents and Trademarks